United States Patent
Özbek et al.

(10) Patent No.: US 12,392,918 B2
(45) Date of Patent: Aug. 19, 2025

(54) MACRO COMPRESSED SENSING DATA ACQUISITION

(71) Applicant: REFLECTION MARINE NORGE AS, Bergen (NO)

(72) Inventors: Ali Özbek, Cambridge (GB); Nicolas Goujon, Oslo (NO); Susanne Rentsch, Slemmerud (NO); Bent Andreas Kjellesvig, Oslo (NO); Halvor Sehested Grønaas, Oslo (NO); Ahmet Kemal Ozdemir, Cambridge (GB); Leendert Combee, Sandvika (NO)

(73) Assignee: Reflection Marine Norge AS, Laskevåg (NO)

( * ) Notice: Subject to any disclaimer, the term of this patent is extended or adjusted under 35 U.S.C. 154(b) by 414 days.

(21) Appl. No.: 17/422,515

(22) PCT Filed: Jan. 14, 2020

(86) PCT No.: PCT/NO2020/050004
§ 371 (c)(1),
(2) Date: Jul. 13, 2021

(87) PCT Pub. No.: WO2020/149746
PCT Pub. Date: Jul. 23, 2020

(65) Prior Publication Data
US 2022/0091294 A1    Mar. 24, 2022

(30) Foreign Application Priority Data
Jan. 14, 2019 (NO) .................................. 20190045

(51) Int. Cl.
*G01V 1/38* (2006.01)
*G01V 1/18* (2006.01)
*G01V 1/20* (2006.01)

(52) U.S. Cl.
CPC ............ *G01V 1/3835* (2013.01); *G01V 1/189* (2013.01); *G01V 1/20* (2013.01)

(58) Field of Classification Search
CPC ........ G01V 1/189; G01V 1/20; G01V 1/3835; G01V 1/3843; G01V 1/3808; G01V 1/003
(Continued)

(56) References Cited

U.S. PATENT DOCUMENTS

| | | | |
|---|---|---|---|
| 4,319,347 A | 3/1982 | Savit | |
| 4,737,937 A * | 4/1988 | Keckler | G01V 1/201 |
| | | | 174/101.5 |

(Continued)

FOREIGN PATENT DOCUMENTS

| | | | | |
|---|---|---|---|---|
| DE | 10325374 A1 * | 12/2004 | | F02D 41/28 |
| GB | 2430744 A1 | 4/2007 | | |

OTHER PUBLICATIONS

DE-10325374-A1 (Machine Translation) (Year: 2004).*
(Continued)

*Primary Examiner* — Yuqing Xiao
*Assistant Examiner* — Christopher Richard Walker
(74) *Attorney, Agent, or Firm* — Flener IP & Business Law; Zareefa B. Flener

(57) ABSTRACT

An invention that relates to streamers is described. These streamers contain one or more streamer sections. These sections can have sensors, channels, and/or analogue arrays of sensors are disposed along its length. At least one of these streamer sections has a variable density of sensors, channels, and/or analogue arrays along the length.

24 Claims, 7 Drawing Sheets

(58) Field of Classification Search
USPC .......................................................... 367/131
See application file for complete search history.

(56) References Cited

U.S. PATENT DOCUMENTS

| | | | | |
|---|---|---|---|---|
| 7,613,071 | B2* | 11/2009 | Iseli .................. | G01V 1/223 |
| | | | | 76/80 |
| 9,819,544 | B2* | 11/2017 | Gagnon ............ | H04L 12/40019 |
| 2008/0285380 | A1* | 11/2008 | Rouquette ................ | G01V 1/20 |
| | | | | 367/15 |
| 2009/0092003 | A1 | 4/2009 | Goujon et al. | |
| 2011/0305106 | A1* | 12/2011 | Eick ..................... | G01V 1/3826 |
| | | | | 367/17 |
| 2013/0294195 | A1* | 11/2013 | Singh ..................... | G01V 1/364 |
| | | | | 367/24 |
| 2015/0117147 | A1* | 4/2015 | Hegge ..................... | G01V 1/16 |
| | | | | 367/15 |
| 2015/0124560 | A1* | 5/2015 | Li ............................ | G01V 1/30 |
| | | | | 367/14 |
| 2016/0018543 | A1* | 1/2016 | Ferber ..................... | G01V 1/30 |
| | | | | 367/14 |
| 2017/0003408 | A1* | 1/2017 | Moldoveanu ............ | G01V 1/20 |
| 2017/0059724 | A1* | 3/2017 | Eick ........................ | G01V 1/003 |
| 2017/0176614 | A1* | 6/2017 | Alhukail .................. | G01V 1/36 |
| 2018/0335536 | A1 | 11/2018 | Li et al. | |

OTHER PUBLICATIONS

Yousif et al. ("IAA-MP: a novel greedy algorithm for severely underdetermined inverse problems", SEG International Exposition and 87th Annual Meeting, (4287-4291) (2017)) (Year: 2017).*
Dondurur ("Acquisition and Processing of Marine Seismic Data", Amsterdam, Netherland: Elsevier, p. 47-50, (2018)) (Year: 2018).*
International Search Report, Mar. 27, 2020, International application No. PCT/NO2020/050004, EPO—Internal, WPI Data.
Derman Dondurur: "Acquisition and Processing of Marine Seismic Data", Mar. 9, 2018, pp. 44-53, figure 2.8.
Norwegian Search Report, Patentsøknads nr. No. 20190045, Jul. 19, 2019 av/by Margrethe Overå.

* cited by examiner

This design is quietest for high noise situations, but the signal will be aliased above 60 Hz if the output points are uniformly spaced

```
┌─────────────────────────────────────────┐
│  Design a first group of sensors to     │
│  attenuate noise in a first frequency   │
│  band                                   │
└─────────────────────────────────────────┘
                    │
┌─────────────────────────────────────────┐
│  Distribute these first groups of       │
│  sensors regularly along a streamer     │
│  with the groups center separated by    │
│  a first distance d                     │
└─────────────────────────────────────────┘
                    │
┌─────────────────────────────────────────┐
│  Design a second group of sensors to    │
│  attenuate noise in a second higher     │
│  frequency band, the second group       │
│  having less sensors than the first     │
│  group (can be a subset of the first    │
│  group)                                 │
└─────────────────────────────────────────┘
                    │
┌─────────────────────────────────────────┐
│  Distribute these groups along the      │
│  streamer such as the centers of        │
│  these second groups are situated       │
│  half-way between the center of the     │
│  first groups                           │
└─────────────────────────────────────────┘
                    │
┌─────────────────────────────────────────┐
│  For all first groups, obtain noise     │
│  attenuated outputs in the first        │
│  frequency band (first group outputs)   │
│  separated by distance d                │
└─────────────────────────────────────────┘
                    │
┌─────────────────────────────────────────┐
│  Spatially interpolate first group      │
│  outputs from spacing d to spacing      │
│  d/2 on the first frequency band        │
└─────────────────────────────────────────┘
                    │
┌─────────────────────────────────────────┐
│  For all first and second groups,       │
│  obtain noise attenuated outputs in     │
│  the second frequency band separated    │
│  by distance d/2                        │
└─────────────────────────────────────────┘
                    │
┌─────────────────────────────────────────┐
│  Combine interpolated first group       │
│  outputs in first frequency band and    │
│  group outputs in second frequency to   │
│  get an output spaced every d/2 in the  │
│  combined first and second frequency    │
│  band                                   │
└─────────────────────────────────────────┘
```

Fig. 11

```
┌─────────────────────────────────────────────┐
│ Design a first group of sensors to attenuate noise in a │
│          first frequency band               │
└─────────────────────────────────────────────┘
                       │
┌─────────────────────────────────────────────┐
│ Distribute these groups irregularly along the streamer, │
│   and use method described in fig 6 to obtain noise     │
│  attenuated regular outputs in this first frequency band │
└─────────────────────────────────────────────┘
                       │
┌─────────────────────────────────────────────┐
│  Design a second group of sensors to attenuate noise    │
│  in a second higher frequency band, the second group    │
│    having less sensors than the first group (can be a   │
│              subset of the first group)                 │
└─────────────────────────────────────────────┘
                       │
┌─────────────────────────────────────────────┐
│  Distribute these second groups irregularly along the   │
│ streamer, and use method described in fig 6 using first │
│  and second groups to obtain noise attenuated regular   │
│       outputs in this second higher frequency band      │
└─────────────────────────────────────────────┘
                       │
┌─────────────────────────────────────────────┐
│   Combine first and second sets of regular output to    │
│      obtain regularly spaced output in the combined     │
│   frequency band (can include an interpolation step for │
│   the first set of regular outputs to get the same spatial │
│             sampling than the second set)              │
└─────────────────────────────────────────────┘
```

Fig. 12

MACRO COMPRESSED SENSING DATA ACQUISITION

The present invention relates to a streamer device. In particular, a sensor device with a varying density of sensors, channels, or sensor arrays along the streamer or streamer section.

The primary application of the invention is seismic data acquisition, but applications to other fields such as sonics and ultrasonics are also possible.

Towed marine streamers are used to perform seismic surveys of the ocean floor in order to map properties of the surface and sub-surface. Streamers each consist of a cable which is towed behind a vessel just beneath the surface of the water. The streamers have a series of sensors coupled thereon which typically measure pressure differences within the water. Sensors measuring velocity or acceleration (motion sensors) can be used as an alternative, or both types of sensor may be used together in order to reduce noise in the outgoing signal as described below. Sensors are typically located in an even distribution along the streamer, and the distance between adjacent sensors may be fixed at around 12.5 m. This configuration results in a density of sensors which does not vary along the length of the streamer (e.g. the density of sensors in this example will be 1 sensor per 12.5 m, or 0.08 $m^{-1}$, all of the way along the streamer).

One or more seismic sources is located on the vessel and periodically emits seismic waves which travel through the water and are reflected at or below the ocean floor. These compressional waves then travel back towards the ocean surface and are measured by the sensors as a series of compressions and decompressions of the adjacent water molecules, providing information about the topography and structure of the ocean surface and sub-surface below the vessel. One streamer may be used, or a number of streamers used together and towed next to each other behind the vessel to form a carpet of sensors (these are known as 3D surveys because of the type of subsurface image that it is possible to make with this type of configuration). A ghost signal is produced by a pressure wave which has passed once adjacent the sensors on the streamer and has been reflected back towards the streamer by the ocean surface. Generally, no additional useful information is provided by this ghost signal and its removal from the final signal is desired. This can be achieved via the use of particle motion sensors to compliment hydrophone sensor readings, which generally achieve a better signal to noise ratio than particle motion sensors. Particle motion sensors provide a directional measurement and so can be used along with the pressure reading to distinguish between waves travelling from the ocean surface and from the ocean floor. The combination of readings from the two types of sensors allows the ghost signal to be removed.

As a streamer is towed, the signal received is subject to a high level of additional noise due to natural movements of the seawater and to movements caused but the vessel and by dragging of the streamer itself through the water. It is of course desired to reduce this noise, and to increase the signal to noise ratio, as far as possible.

Traditionally, both sensors and output points have been evenly distributed along the length of a streamer or a streamer section with constant spacing. The distance between adjacent output points, or between adjacent sensors on the streamer, does not in such a case vary along the streamer. The selection of distance between output points and the number of output points required on a streamer is dictated by signal sampling requirements, and the selection of distances between sensors, and the number of sensors used is dictated by noise sampling and attenuation requirements.

The Nyquist sampling criteria, which determine the minimum signal sampling rate to retain a certain level of information from the signal, dictate that to properly sample the signal an output about every 3 meters (3.125 m) is required, corresponding to a sampling rate of 1 measurement every 2 ms. This does, however, add cost and complexity to the apparatus and an output located every 12.5 meters on the streamer is commonly provided. This lower sampling rate results in aliasing particularly at higher frequencies and in situations where the propagation direction of the compression wave is close to horizontal.

According to a first aspect of the present invention, there is provided a streamer comprising at least one streamer section, the at least one streamer section comprising sensors, wherein the density of the sensors varies along the at least one streamer section.

In embodiments, the streamer comprises a plurality of output points to which data from a group of sensors is fed and sensor density is highest around the output points, with a lower density of sensors between the output points.

In embodiments, the sensors are particle motion sensors and/or pressure sensors.

In embodiments, the density of the sensors measured within a 5 m sliding window varies by a factor of at least 1.3 along the streamer.

In embodiments, the density of the sensors measured within a 6.25 m sliding window varies by more than a factor of 1.5, 2, or 3, the density of sensors measured within a 12.5 m sliding window varies by more than a factor of 1.5, 2, or 3, the density of sensors measured within a 25 m sliding window varies by more than a factor of 1.5, 2, or 3, or the density of sensors measured within a 50 m sliding window varies by more than a factor of 1.5, 2, or 3.

In embodiments, a sensor density function is defined which describes the density of sensors in a section of streamer centred on a particular position as a function of the position, and wherein the local maxima of the sensor density function along the streamer have a non-uniform distribution.

In embodiments, the spacing between adjacent output points along the streamer is not constant.

In embodiments, one or more of the sensors comprises an analogue array of sensors.

In embodiments, each sensor is associated with a single channel for transfer of data from the sensor or analogue sensor array to an output point.

In embodiments, each of the output points is located midway between the positions of the outermost sensors in the group of sensors from which it receives data.

According to a second aspect of the present invention, there is provided a streamer according to any of claims 1 to 9, wherein the sensors are grouped into: a plurality of first sensor groups, each first sensor group comprising between 3 and 5 sensors and being configured to feed data to an associated output point, wherein the output points fed by the first sensor groups are spaced at an average of between 5 and 15 meters apart along the streamer: a plurality of second sensor groups each comprising fewer sensors than the number of sensors in each of the first sensor groups, the second sensor groups being positioned between adjacent first sensor groups along the streamer and being configured to feed data to an associated output point.

In embodiments, first sensor groups are spaced around 12.5 meters apart along the streamer.

In embodiments, the second sensor groups are positioned midway between adjacent first sensor groups along the streamer.

In embodiments, all output points on the streamer are configured to forward for processing sensor data associated with a signal having a frequency above a threshold frequency and only the output points associated with the first sensor groups are configured to forward for processing data associated with a signal having a frequency at or below the threshold frequency.

In embodiments, the threshold frequency is around 60 Hz.

According to a third aspect of the present invention, there is provided a method for optimizing the distribution along a streamer of a plurality of sensors and a plurality of output points to which data from a group of the sensors is fed, the method comprising: determining the position of the output points along the streamer; and using the determined output point positions, configuring groups of the sensors to feed data to each output point and positioning these groups along the streamer, wherein the position of the sensor groups is determined such that the distribution of sensors along the streamer is non-uniform.

In embodiments, the position of each output point is at the gravitational centre of the group of sensors from which it is configured to receive data.

In embodiments, the sensor positions are determined such that the density of sensors is highest around the output points and lowest between the output points.

In embodiments, the step of determining the positions of the output points comprises ensuring that the output points are non-uniformly distributed along the streamer.

In embodiments, the method comprises using compressed sensing algorithms to reconstruct a set of regularly spaced outputs along the streamer from the signal at the output points, wherein the number of regularly spaced outputs is larger than the number of output points.

According to a fourth aspect of the present invention, there is provided a streamer comprising one or more streamer sections, each streamer section having a plurality of sensors mounted along it and a plurality of output points to which data from a group of the sensors is input, the sensors including: a plurality of first sensor groups, each first sensor group comprising between 3 and 5 sensors and being configured to feed data to one of the output points, wherein the output points fed by the first sensor groups are spaced at an average of between 5 and 15 meters apart along the streamer: a plurality of second sensor groups each comprising fewer sensors than the number of sensors in each of the first sensor groups, the second sensor groups being positioned between adjacent first sensor groups along the streamer and each being configured to feed data to one output point, the output points fed by the second sensor groups also being positioned between adjacent output points fed by the first sensor groups. The first (larger) sensor groups are therefore each larger than each of the second (smaller) sensor groups. First sensor groups may also be longer than second sensor groups as well as comprising a greater number of sensors, but this is not necessarily the case.

In embodiments, each output point is located midway between the positions of the outermost sensors in the group of sensors from which it receives data.

In embodiments, first sensor groups are spaced around 12.5 meters apart along the streamer.

In embodiments, the second sensor groups are positioned midway between adjacent first sensor groups along the streamer.

In embodiments, the sensors in the second group are a subset of the sensors in the first sensor group. This may be true for some, but not all, of the second sensor groups. This may be true for around half of the second sensor groups (because these are spaced closer together than the larger, first sensor groups).

In embodiments, all output points on the streamer are configured to forward sensor data associated with a signal having a frequency above a threshold frequency for processing and only the output points associated with the first sensor groups are configured to forward data associated with a signal having a frequency at or below the threshold frequency for processing.

In embodiments, the threshold frequency is around 60 Hz.

In embodiments, the density of sensors is highest around the output points and is lowest between the output points.

According to a fifth aspect of the present invention, there is provided a streamer characterized in that it comprises one or more streamer sections comprising sensors, wherein the density of the sensors varies along at least one of streamer sections.

In embodiments, the sensors density is highest around the output points, with a decreasing density of sensors between the output points.

In embodiments, the sensors are particle motion sensors and/or pressure sensors.

In embodiments, the density for at least one sensor streamer section has a density of the sensors over an at least 5 m sliding window that varies by a factor of at least 1.3.

In embodiments, the density of the sensors over a 6.25 or 12.5 or 25 or 50 m sliding window varies by more than a factor of 1.5 or 2 or 3.

In embodiments, the local maxima of the sensor density function along at least one streamer section has a non-uniform distribution.

In embodiments, there is a non-constant spacing between density peaks.

According to a sixth aspect of the present invention, there is provided a streamer characterized in that it comprises one or more streamer sections comprising channels, wherein the density of the channels varies along at least one of streamer sections.

In embodiments, the sensors density of the channels is highest around the output points, with a decreasing density of channels between the output points.

In embodiments, the channels are recording particle motion sensors and/or pressure.

In embodiments, the density for at least one sensor streamer section has a density of channels over an at least 5 m sliding window that varies by a factor of at least 1.3.

In embodiments, the density of the channels over a 6.25 or 12.5 or 25 or 50 m sliding window varying by more than a factor of 1.5 or 2 or 3.

In embodiments, the local maxima of the channel density function along at least one streamer section has a non-uniform distribution In embodiments, there is a non-constant spacing between density peaks.

According to a seventh aspect of the present invention, there is provided a streamer characterized in that it comprises one or more streamer sections comprising at least one analogue arrays of sensors, wherein the analogue array centres are distributed non-uniformly along at least one of the streamer sections.

In embodiments, at least one of the analogue array density is highest around the output points, with a decreasing density between the output points.

In embodiments, at least one of the analogue arrays of sensors are recording particle motion sensors and/or pressure.

In embodiments, the density for at least one sensor streamer section has a density of the analogue arrays of sensors over an at least 5 m sliding window varying by a factor of at least 1.3.

In embodiments, the density of at least one of the analogue arrays of sensors over a 6.25 or 12.5 or 25 or 50 m sliding window varying by more than a factor of 1.5 or 2 or 3.

In embodiments, the local maxima of the sensor array density function along at least one streamer section has a non-uniform distribution In embodiments, there is a non-constant spacing between density peaks.

The present invention addresses the issue of noise and aliasing in a signal of this type as will be described in detail below. The invention is applicable to all seismic data acquisition scenarios, including towed streamer, seabed, node and land seismic data acquisition, but we use the towed streamer scenario in the following description as a platform to explain the ideas. Therefore, when arguments are made, the towed streamer terminology (where each streamer may comprise a number of streamer sections, for example 100m streamer sections) will be used, without affecting the generality of eventual claims.

The below terms have much wider meaning to one skilled in the art than what will be presented. These are more concise, but no limitation of the standard meaning is implied or intended.

It is important to understand the concept of input points and output points. Input points correspond to the physical positions of the sensors which sense or measure the raw data, and the output points correspond to the physical positions along the streamer at which signal estimates are provided, usually by combining data from multiple sensors forming a group by hardware or software means. The positions of the sensors within a group may be measured relative to the position of the linked output point, and the positions of the various output points are used along with the received signal to reproduce an ocean floor structure via signal processing of the output signals received from their known positions along the streamer.

A streamer, which can be several km long, is usually not a continuous cable, but made by connecting together several streamer sections, which can for example each be 100 m, 150 m or 200 m long. A combination of streamers of different length can be used. This allows a change in the length of the streamer depending on the need, and provides the ability to replace one section rather than replacing a complete streamer in case of a technical failure.

The term sensor used herein refers to any device or devices usable for measuring different properties of interest. Particle motion sensors (such as geophones, accelerometers, and/or rotation sensors) or pressure sensors (such as hydrophones) measuring seismic signals are the most common, and these are particularly suitable for use with the methods described below. Any sensor suitable to measure particle motion or pressure changes and suitable for mounting on a streamer can, however, be used.

Particle motion sensors may be sensors for measuring velocity or acceleration, for example moving coil geophones, MEMS accelerometers, or piezoelectric accelerometers. Hydrophones are sensors for measuring pressure changes, for example by piezoelectric means.

An analogue array is a set of hardwired sensors connected together to one electronic channel. These may typically comprise 4 to 16 sensors that are each 2 m to 15 m long (and which can be overlapping). Sensor distribution can be uniform or non-uniform. The output point is usually located at the center of the array. The center of the array may be the physical center, the gravitational center, or both. For an array of this type, at least some of the noise attenuation is carried out by summing together the analogue signals from sensors within the array.

Where separate sensors are used rather than sensors forming an analogue array, these may each be linked to their own channel, and channels for several sensors may provide input data to a particular output point.

A channel or electronic channel typically includes an amplifier or preamplifier and an ADC (analog to digital converter). These digitize the signal from the sensor or from the sensor array, so that there is a channel every time a reading from an analogue sensor or an analogue sensor array is digitized. If only one sensor is connected to a channel, this is referred to as a single sensor recording. If several sensors are connected to a single channel, this is referred to as sensor array recording. The number of channels present may correspond to the number of data points transmitted through the seismic cable to the vessel. Output points are not themselves equivalent to channels. Output points correspond to the data points recorded to tape or provided as an output to the client. These may link to a channel which itself carries data collected from a plurality of sensors or may link to a number of channels each transferring measurement data collected from a single sensor. Alternatively, a number of channels each linked to more than one sensor may couple to a single output point. Each output point need not, therefore, be associated with one or only one analogue sensor array or channel. A further channel will carry data, which will generally be digitized at this point, from the output point to the processing software. This processing software will usually receive signals from many output points positioned at known physical locations along the streamer for use in reproducing the signal received from the sub-surface and therefore the structure of the sub-surface itself.

For a single sensor recording (one channel for one sensor) the position of the channel or the channel position is the same as the position of the sensor. For an analogue array recording (several sensors combined as an array for one channel) the position of the channel is generally at the center or at the center of gravity of the array.

There are situations where noise events are locally coherent. FIG. 1 discloses an example of strong locally-coherent noise from a tow test. In some data acquisition scenarios, the data can be affected by noise that has a relatively short coherence length. An example is shown in FIG. 1, where accelerometer data are shown which have been acquired in a towed streamer experiment. The panel on the left is in the time-offset (space) domain and the panel on the right is in the frequency-offset domain.

In particular where locally coherent noise is an issue, the signal reproduction may be improved by denser sensor sampling near to the output points as described below. To make this point, we again use an example from towed streamer seismic acquisition. FIG. 2 discloses an example of sensor spacing to give alias-free outputs to 125 Hz (higher if filter incorporates antialiasing). Figures indicate the position of sensors along a streamer section using triangles. FIGS. 2, 3, 5, and 7 indicate the position of output points along the streamer using arrows.

This application describes a new method to acquire data that has higher signal-to-noise ratio (SNR) than what is common in the presence of locally coherent noise. The system described is especially relevant where the number of sensors is limited and describes how the sensors may be placed to reduce the detrimental effects of noise and aliasing whilst minimizing the number of sensors required on the streamer. Part of how the invention does this is through use of a variable density function of sensors, channels, and/or analogue sensor arrays along the length of the streamer or streamer section.

Consider two types of sensor layouts, as shown in FIG. 2 and FIG. 3. The blue triangles indicate relative positions of sensors, whereas the red arrows show the output points. In FIG. 2, the desired output points are uniformly spaced at 6.25 m intervals. This is intended to give alias-free outputs up to 120 Hz, assuming 1500 m/s apparent velocity for the slowest seismic signal energy in marine seismic acquisition. This shows a non-uniformly spaced sensors to avoid noise aliasing. If anti-aliasing filters are used, alias-free outputs to higher frequencies may be achieved, at the expense of some dipping events at higher frequencies.

The density of the sensors at a point on the streamer refers to the number of sensors per unit length at that point. If the number of sensors per unit length is fixed, then sensors can be distributed in various ways. If there are sufficiently large numbers of them available, they can be placed in regular intervals according to the Nyquist criterion, however doing so will generally mean a high cost, weight, and complexity of the apparatus because of the large number of sensors required. If the sensor spacing is fixed, then the density of sensors will not vary along the streamer. For a sensor spacing of 5 meters, for example, the density of sensors will be 0.2 sensors per meter (or $\frac{1}{5}$ $m^{-1}$) at all locations on the streamer.

One alternative approach is to place the sensors pseudo-randomly (at non-uniform intervals), so that hard aliasing is avoided. One possible pseudo-random sensor distribution is shown in FIG. 2. To provide clean outputs at all the desired output points, the sensors must be relatively well spread along the streamer.

Another approach, which has been shown to be particularly effective in reducing noise, is to concentrate (cluster) the sensors nearer the output points to better attenuate the short-coherency-length noise. One possible clustered sensor distribution is shown in FIG. 3. This discloses sensor spacing to give cleaner signal at output points (but unaliased only to 60 Hz—higher if filter incorporates anti-aliasing). The figure shows uniformly spaced output points with a spacing distance of 12.5 meters. The density of the sensors along the streamer section shown in FIG. 3 is now non-uniform. The number of sensors per meter (density of sensors) is higher near to the output points and lower (falls to zero) away from the output points.

As sensors are expensive and are therefore at a premium, denser sampling near the output points may necessitate going with a coarser distribution of output points (the distance between adjacent output points being larger on average along the streamer). The superior noise attenuation by denser sampling near output points in the above example is achieved at least partly by dedicating more sensors to each output point (twice as many, in this example) compared to the pseudo-random sampling strategies. If the total number of sensors per section is fixed due to cost implications, for example, then this implies that the number of output points must be less. In FIG. 3 this is shown for an output points spaced at intervals of 12.5 m, which is equal to half the output interval in the example shown in FIG. 2.

If output points are uniformly spaced, however, then coarser output points may lead to unacceptable levels of signal aliasing. The output points can in general be positioned at uniform or non-uniform intervals. If the they are positioned at uniform intervals, the Nyquist criterion places an upper limit on how long the intervals can be if unaliased output data are required up to a desired frequency.

If the number of sensors (e.g. per streamer section) is fixed, then this defines the maximum number of sensors that can be allocated per output group. If better noise attenuation is desired, a higher number of sensors per output point will be required, necessitating a reduction in the number of output points since the number of sensors is fixed. With uniform output spacing this will mean longer intervals between the output points, resulting in aliasing.

FIG. 4 shows a comparison of the noise attenuation performance of the two distributions illustrated in FIGS. 2 and 3 (where the output points are distributed evenly along the streamer such that the distance between adjacent output points is fixed). The figure shows the power spectral density of the noise vs frequency. We see that the noise attenuation achieved for a clustered sensor configuration similar to that depicted in FIG. 3 is about 10 dB higher (except at very low frequencies) than different pseudo-random configurations like the one shown in FIG. 2.

If output points are uniformly spaced, coarser output points may lead to unacceptable levels of noise/signal aliasing. A regular output interval (distance between adjacent output points along the streamer) of 12.5 m will, for example, give alias-free output only to 60 Hz. Therefore, if output points are uniformly spaced, the noise attenuation shown in FIG. 4 is only feasible at the cost of allowing signal aliasing at the output.

A denser sampling around an output point has been shown to be beneficial in attenuating short coherency noise at that output point as mentioned above. This requires a given minimum number of sensors per output point (to achieve a desired level of noise attenuation), but there will also usually be a maximum achievable number of sensors per seismic section (which is generally dictated by cost considerations). The result is that there must be fewer output points than necessary to sample the signal above certain wavenumbers adequately according to classical sampling theory. In particular, with uniform output points, certain signal wavenumbers will be aliased and thus cannot be recovered properly. Therefore, there appears to be a dilemma that we must allow either more noise or more aliased signal than would be desirable.

A solution to this is to position the output points at non-uniform intervals in order to prevent hard-aliasing of the signal. The output signal that is non-uniformly sampled can be regularized (interpolated onto a regular grid) using one of several compressed-sensing methods. Otherwise, they can be used directly, for example for seismic imaging, using their known irregular (non-uniform) positions.

A sensor density function can be defined to describe the density of sensors in a section of streamer centred on a particular position as a function of the position of the section. The density function will be highest where the sensors are closely spaced (density of sensors in a section of streamer within which the sensors are closely spaced is high) and will be lowest where sensors are sparsely distributed. In a case where sensors are clustered in groups, each group will represent a local maximum in the density function. These local maxima need not be of the same size but will be considered local maxima provided that density is higher than adjacent positions. The global maximum of the density function for a streamer will represent the highest of these local maxima.

Use of both a non-uniform distribution of output points along the streamer and a varying density of sensors along the streamer, in particular where this corresponds to a higher density of sensors at or near to the output points, can reduce noise and aliasing and thus can achieve a clean signal without unacceptable increase in the number of sensors required. Embodiments of the present invention will now be described, by way of example only, with reference to the following diagrams wherein:

FIG. 1 plots a strong locally-coherent noise from a tow test.

Figure 7:
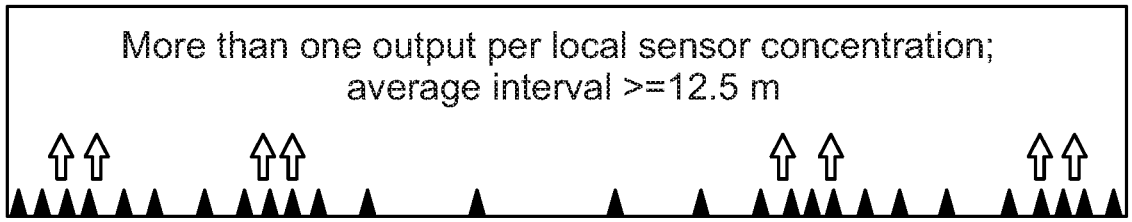

FIG. 7 discloses an example using more than one output per local sensor cluster.

Figure 8:
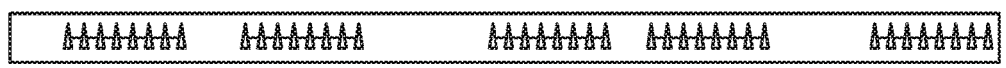

FIG. 8 provides a schematic example of arrays distributed non-uniformly along a streamer.

Figure 9:
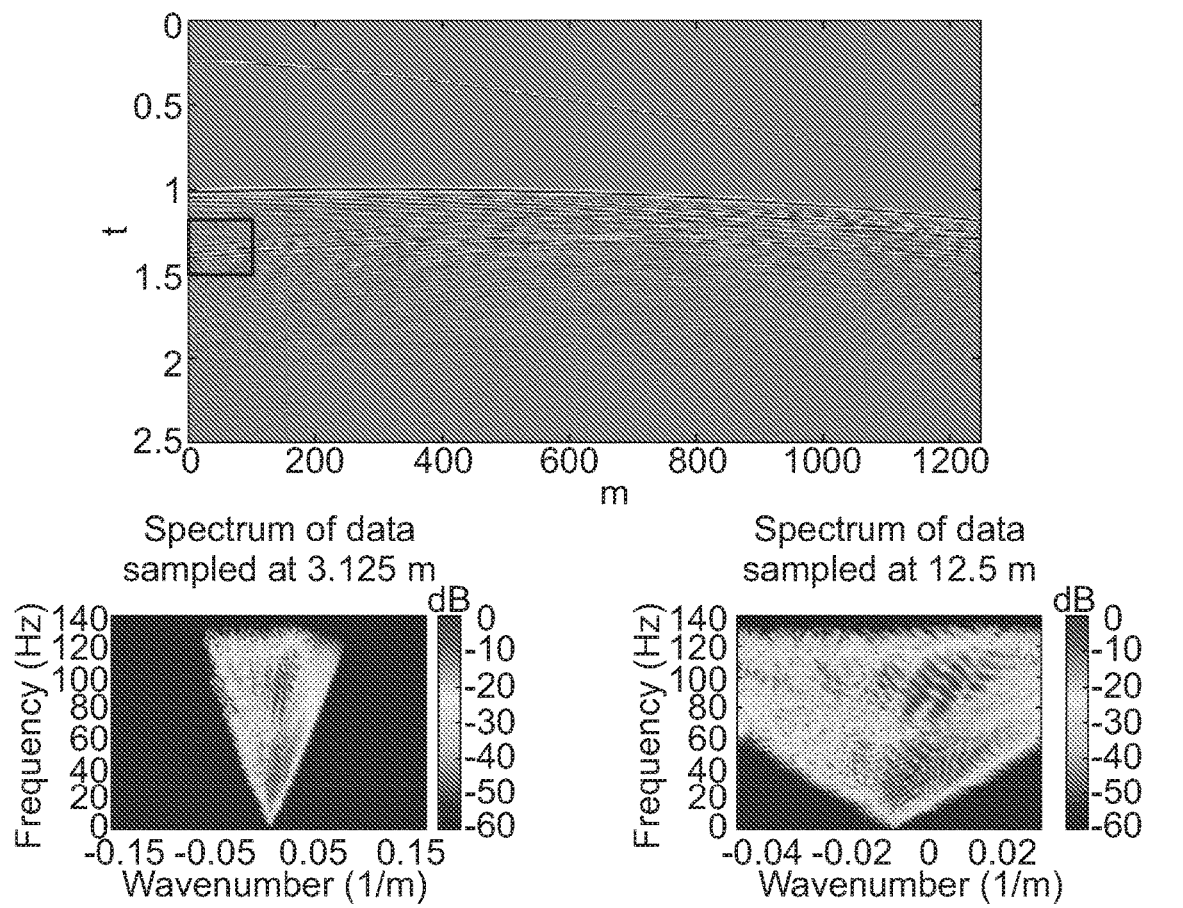
Figure 9:
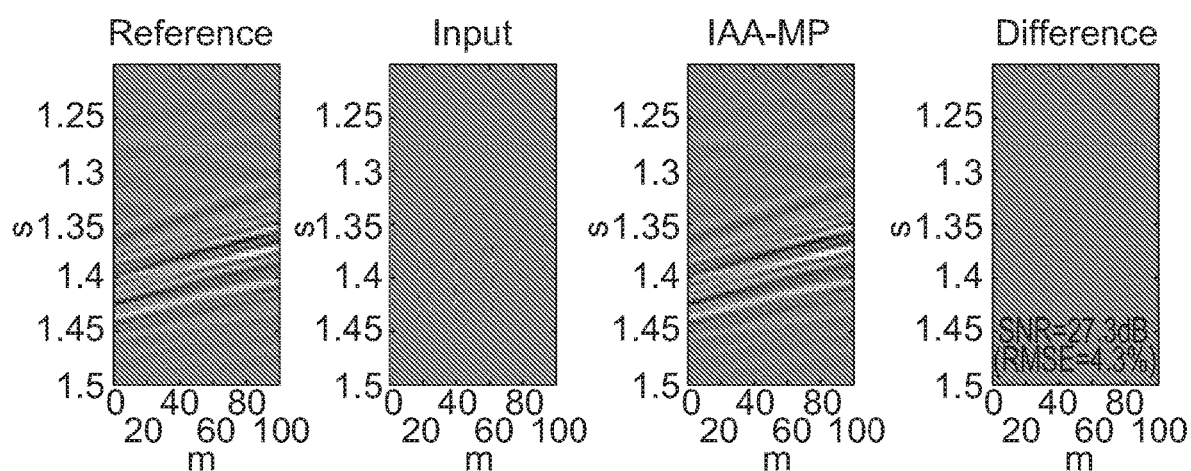

FIG. 9 shows the results of a synthetic example using SEAM finite-difference data.

Figure 10:
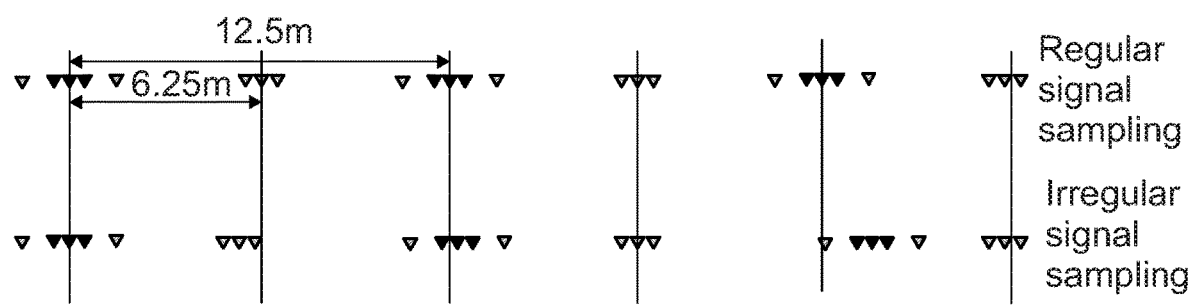

FIG. 10 shows a schematic example of sensors distributed in groups of different sizes along a streamer. The top row distributes sensor groups uniformly along the streamer section and the bottom row distributes the same groups non-uniformly.

FIG. 11 illustrates a method for reproducing a signal where different sets of sensor groups are used to account for different frequency ranges in the signal.

FIG. 12 illustrates a method for reproducing a signal where different sets of sensor groups are used to account for different frequency ranges in the signal and these groups are non-uniformly distributed along the streamer section.

In some embodiments, the invention uses non-uniform intervals both of input points (sensor locations) and output points to obtain high quality (high SNR) estimates of the signal from the noise affected measurements.

As discussed previously there is a trade-off between allowing more noise or allowing more aliased signal than desirable. Non-uniform output sampling can solve signal and noise sampling issues simultaneously. The problem of aliasing can be overcome at least partly by relaxing the requirement that the spacing of the output points should be regular, and appeal to compressed sensing (CS) by allowing non-uniformly spaced output points.

Figure 5:
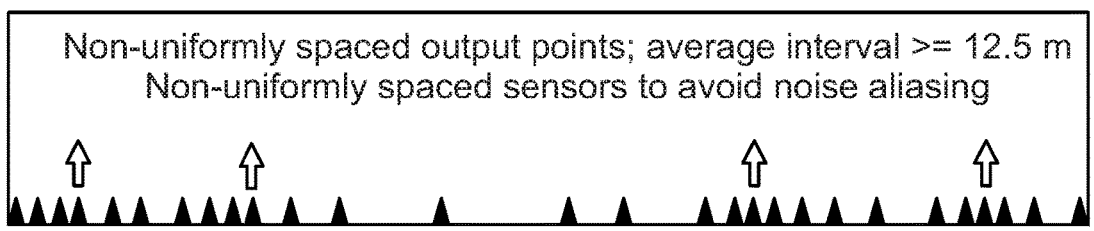
FIG. 5 shows an example of non-uniformly spaced output points to avoid aliasing while allowing good noise attenuation by including sensors which are clustered near to output points.

FIG. 5 shows one possible configuration of sensors (input points) and output points in an embodiment. Non-uniformly spaced output points (average interval greater than 12.5 m) are included in order to avoid aliasing while the apparatus allows good noise attenuation by using sensors which are clustered near to output points. The sensors are clustered by the output and are not uniformly distributed. Reference to non-uniform distribution refers to the fact that the distances between adjacent sensors, or between adjacent output points is not fixed along the streamer. For an output point located between two adjacent output points, for example, the distance to the nearest output point in one direction along the streamer may be less than the distance to the nearest output point in the other direction along the streamer. The same goes for a sensor located between two other sensors on the streamer if the distribution of sensors is also chosen to be non-uniform. Output points may be pseudo-randomly spaced along the streamer section or streamer.

Figure 6:
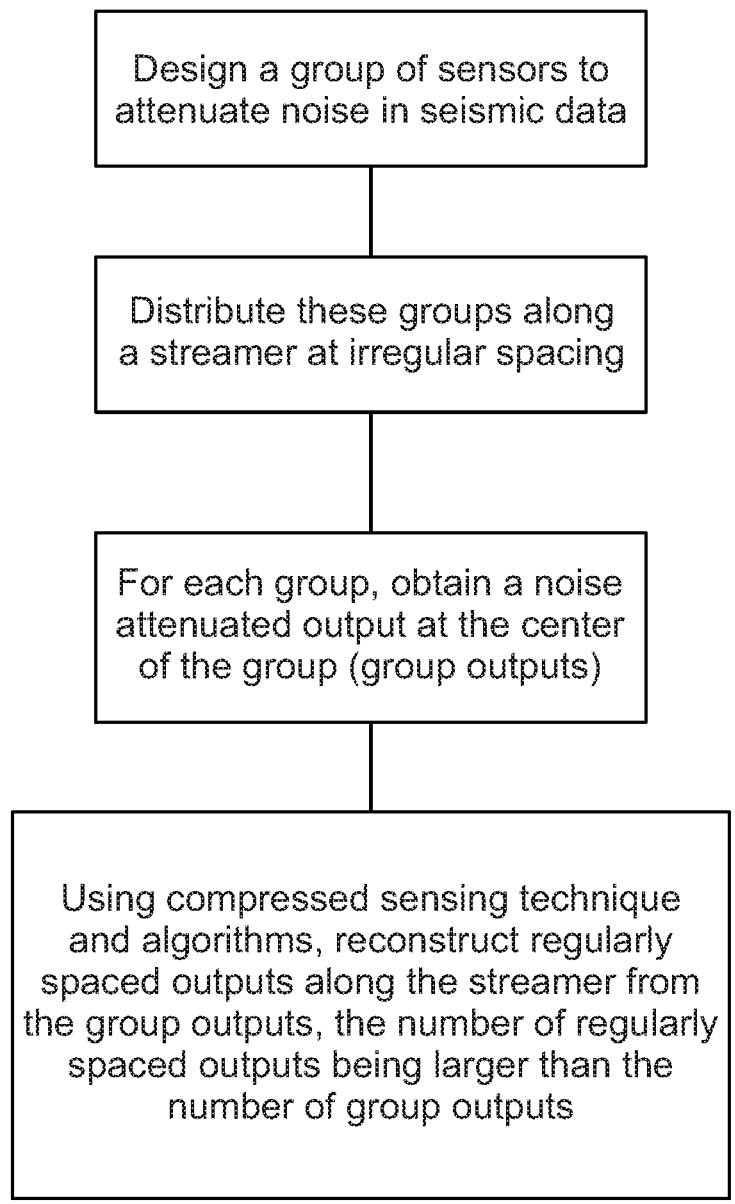
FIG. 6 shows a flow chart of the method used to reproduce a signal where output points are non-uniformly distributed.

This example includes fewer output points per unit length of the streamer as compared to 16 output points per 100 m section if 6.25 m regular intervals are chosen, but the signal is cleaner (i.e. producing output data with higher SNR). Cleaner output data are more suitable for a compressed sensing solution, including regularizing to a regular grid using state of the art CS methods. FIG. 6 shows a flow diagram of a method for reproducing a signal using non-uniformly distributed output points. Compressed sensing algorithms are used to account for the fact that the output points are not uniformly distributed by reconstructing regularly spaced outputs along the streamer using the non-uniformly spaced outputs at the output points. There will generally be a higher number of reconstructed outputs than there are output points physically spaced along the streamer.

The example described above therefore allows various noise attenuation methods to produce cleaner output traces. As a non-limiting example, suppose there are 56 sensors (input points) per streamer section (which may be 100 m long). If there are 16 uniformly sampled output points as in the above example, there would be 3.5 sensors per output point, and these sensors must be fairly well (non-uniformly) distributed along the streamer to make sure each of those 16 output points give reasonably clean outputs. Instead, if there are fewer (but non-uniformly spaced) output points that need attention, noise attenuation methods can deliver cleaner results because more sensors will be available to provide data to each output point (or the apparatus can use even fewer sensors). For example, if we find that 8 non-uniformly sampled output points per section are sufficient, we would have 7 sensors per output point, and 11 if we need only 5 output points.

Compressed sensing recovery algorithms would be used to reconstruct the signal using the cleaner output data. Examples include: IAA-MP and BPDN. Other examples will be readily apparent to one skilled in the art.

In implementing an embodiment using non-uniform distribution both of sensors and of output points, it is suggested that the non-uniform output point positions first be optimized. Assuming clean (signal-only) outputs, one could search for optimal non-uniform output positions that would allow best reconstruction. This would be followed by the step of optimizing input (sensor) positions to match the output points.

Adapting any of our current sensor optimization techniques, we would then optimize the sensor positions to give us the cleanest output at the chosen positions. This may involve clustering sensor positions around output points. Sensors within a group associated with a particular output point may be distributed uniformly (a group of 5 sensors may be placed at 0.2 meter spacings with the output point equidistant between the two outermost sensors, for example). This will still result in an uneven or non-uniform distribution of sensors along the streamer because the distance to an adjacent group of sensors, which are associated with the next output point along the streamer, will be different from the spacing between sensors within a group (i.e. will not be 0.2 meters in this example).

Of course, in some embodiments, sensors within a group coupled to a single output point may also be distributed non-uniformly. A non-uniform distribution of sensors or output points may, but will not always, imply that all distances between adjacent sensors or adjacent output points on a particular streamer section are different from one another.

The distribution of sensors or of output points can, however, be considered non-uniform provided that at least some of the distances between adjacent sensors or adjacent output points on a streamer section are different.

This two-stage optimization could also be coupled into a single-stage, but this will require a more expensive optimization effort.

In some embodiments, it may be possible (and advantageous) to produce more than one output per sensor cluster.

We can design noise attenuation methods to give outputs at more than a single point for a given cluster of sensors. This would be beneficial for reconstruction; for example, by defining a supplementary finite-difference signal. An example of this configuration is shown in FIG. 7. The average interval is greater than or equal to 12.5 in this example.

FIG. 8 discloses a schematic example of arrays distributed non-uniformly along a streamer. Each triangle represents a sensor, a group of sensors close together that are connected represents an array of sensors. Notice that the sensor arrays themselves are distributed in a non-uniform manner along the streamer section. A single channel will carry data from all sensors within an array to the output point. Even though the sensors of FIG. 8 are shown equally spaced along or within each of the sensor arrays, this is for illustrative purpose only. These sensors can also be non-uniformly distributed. Output point positions may correspond to the physical and/or gravitational center of each array.

FIG. 9 shows a numerical example. The data illustrated as plots in the figure were created using a finite-difference code, based on the SEAM model. The red box in the top panel shows the part of the data that was used for the test. The left panel in the middle row shows the f-k transform of the test data; the right panel shows the aliasing that would occur if the data were sampled regularly at 12.5 regular intervals. The bottom row shows the test results, comparing the finely sampled reference with the reconstruction performed using the IAA-MP algorithm in a single tx-window.

A clean signal can be reconstructed (regularized) onto a regular grid if sampled non-uniformly. The signal has frequency content up to 125 Hz, so it is clearly aliased if sampled regularly at 12.5 m. The second panel at the bottom row of FIG. 7 shows an example wherein the 8 output points are non-uniformly distributed across 100 m, giving an average spacing of 12.5 m. The data are then regularized to a fine grid, to compare with the input. The reconstruction error using the IAA-MP algorithm is less than 5% RMS.

The density for at least one streamer section has a density of the sensors, channels, and/or arrays of sensors over an at least 5 m long sliding window varying by a factor of at least 1.3. For example, the density of the sensors within a 6.25 m sliding window may vary along the streamer by more than a factor of 1.5, 2, or 3. The density of sensors within a 12.5 m sliding window may vary along the streamer by more than a factor of 1.5, 2, or 3. The density of sensors within a 25 m sliding window may vary along the streamer by more than a factor of 1.5, 2, or 3, or the density of sensors within a 50 m sliding window may vary along the streamer by more than a factor of 1.5, 2, or 3.

A sliding window refers to a movable section or length of the streamer within which the number of sensors can be counted to determine a measure of sensor density. The number of sensors counted will of course depend on the size of this window. A measure of the density of sensors at the section of streamer within the window can then be determined by dividing the number of sensors counted by the size of the window. By sliding the window along the length of streamer (moving the location of the section of streamer being examined), several measurements indicating the density of sensors at the position of each section of streamer can be determined. The positions may or may not overlap. A statement that the density of sensors within a 5 m sliding window varies more than a factor of 1.5, for example, indicates that there will be a position on the streamer at which the window can be located to give the smallest density measurement and a position at which it can be located to give the largest density measurement, and the resulting value of the largest density measurement will be more than 1.5 times the value of smallest density measurement.

In some cases, the density measured for some positions of the window may be zero. In one example of a streamer, sensors are distributed in groups which each cover a length of around 3 m on the streamer. These 3 m long groups of sensors will usually each be linked to one output point located in the centre of the group (around 1.5 m from each of the outermost sensors) but may be linked to more than one output point. Output points are spaced around 12.5 m apart along the streamer section.

The distance between output points may be non-uniform, so that output points are spaced an average of 12.5 m apart along the streamer section. In this case, there will be an average gap between sensor groups of around 9.5 m. When a 5 m window is positioned over this gap, no sensors will be present within the window and the density will be measured as zero. In such a case, the ratio of the highest density measured in a sliding window (which may be a 1 m, 2.5 m, 5 m, 6.25 m, 12.5 m, or a 25 m sliding window) on the streamer and the lowest non-zero density (where the window contains 1 sensor, for example) measured in the same sized sliding window will be more than 1.5, 2, or 3.

If a zero density is measured with the sliding window located at a point on the streamer, then the ratio between the highest measured density in a 5 m sliding window and the lowest non-zero density measured in a 1 m, 2 m, 5 m, 6.35 m, 12.5 m, or 25 m sliding window will be more than 1.5, 2, 3, 5, or 10. Any combination of these window sizes and ratios is intended to be covered here.

Figure 1:
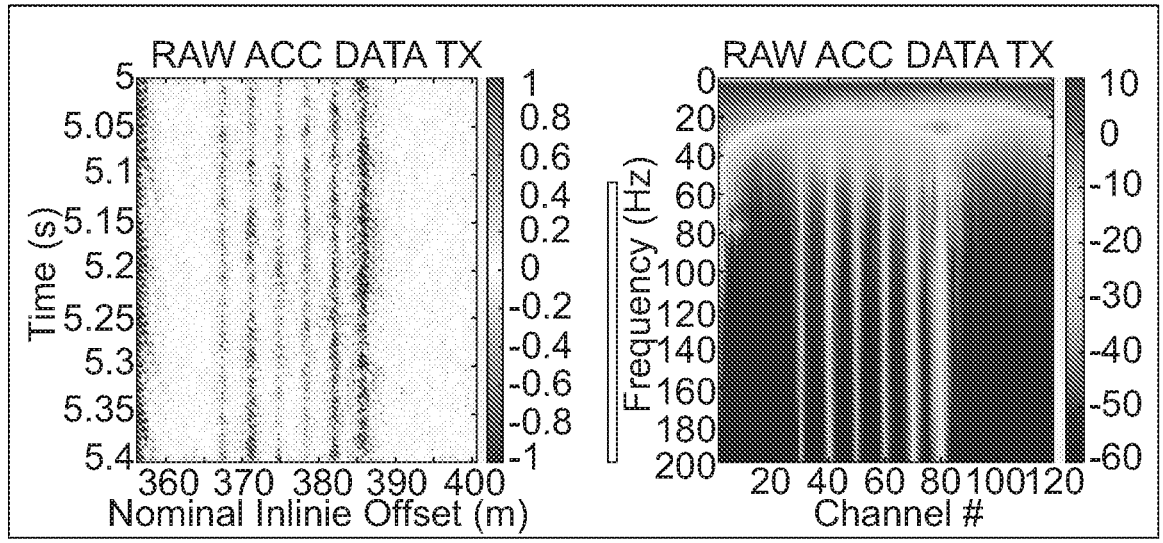
Figure 2:
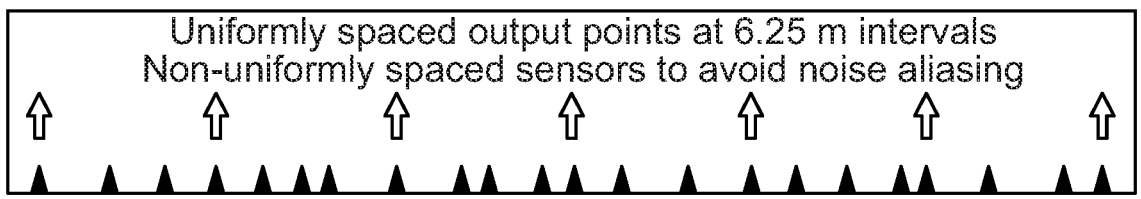
FIG. 2 shows an example of sensor spacing to give alias-free outputs to 125 Hz (higher if filter incorporates antialiasing).
Figure 3:
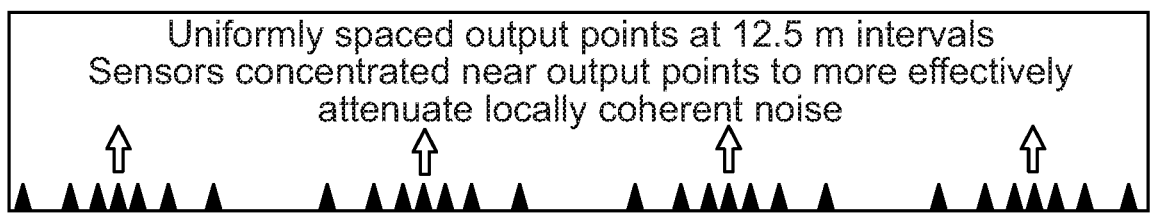
FIG. 3 shows an example of sensor spacing to give cleaner signal at output points (but unaliased only to 60 Hz; higher if filter incorporates anti-aliasing).
Figure 4:
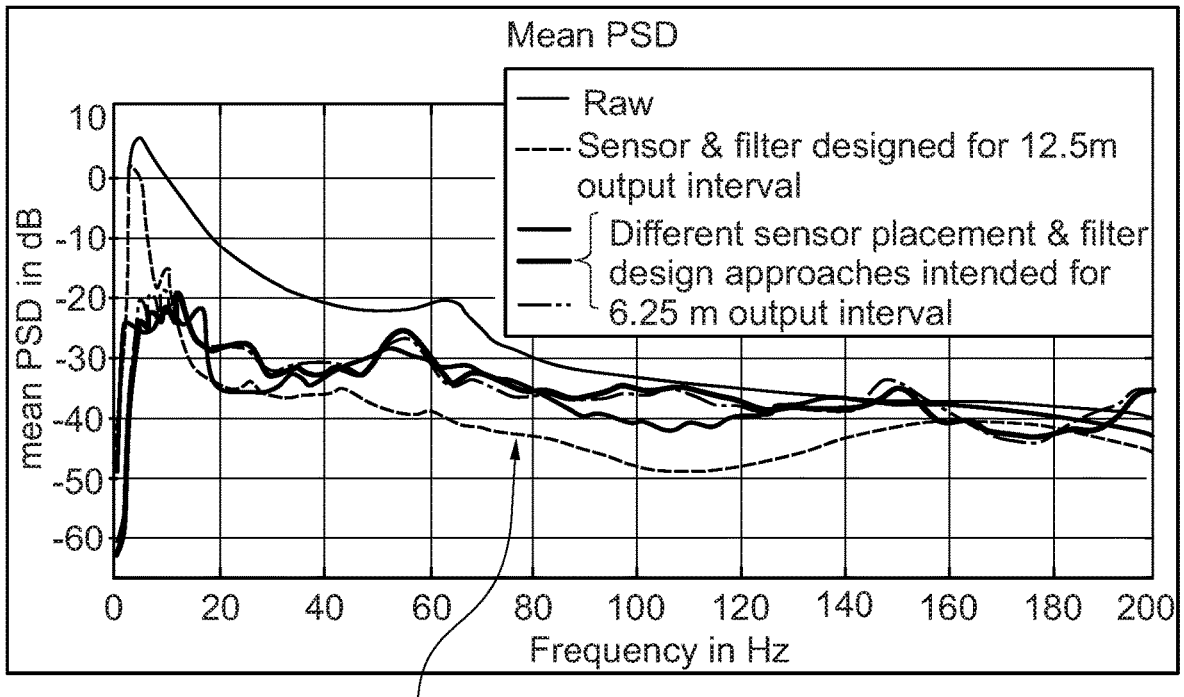
FIG. 4 shows the results of a test of sensor placement and filter design intended for uniformly spaced output points.

How many output points are required to be present for a given length of the streamer to achieve a given signal quality will depend on the frequency of the signal being measured. For a higher frequency signal, output points will be required to be closer spaced (higher density of output points) in order to achieve a good reproduction of the signal during the processing stage. This is because a sampling rate which is too low may not allow two signals at different frequencies to be distinguished from one another. For a higher frequency signal, a higher sampling rate is generally required. Noise in the case of seismic reflections at streamer sensors, however, is higher at lower frequencies (see FIG. 4). For a lower frequency, therefore, a lower density of output points is required, but the number of sensors required to feed signals to each output point will need to be higher in order to counteract the effect of the higher noise level in the signal.

In order to cater for both high and low frequencies in the signal whilst minimizing the number of sensors required on a particular streamer section, sensors can be distributed along the section as shown in FIG. 10. In the upper row, output points (and sensor groups) are uniformly distributed along the streamer, and in the second row output points (and sensor groups) are non-uniformly distributed. In the example shown, sensors are located in groups which each center on an output point, and which are clustered around their associated output point as described above.

Groups of 5 sensors (green/dark triangles) are positioned every 12.5 meters along the streamer. Smaller groups of 3 sensors are positioned every 6.25 meters (pink/light triangles). Some (in this case 3) of the sensors in each of the larger groups also form one of the smaller groups of sensors. Some or all of the sensors within the groups of 5 are therefore used to provide output for the lower frequency signal as well as the higher frequency signal. The requirements in terms of noise reduction and sampling rate are met for both frequencies, but fewer sensors are used than in a case where groups of 5 sensors are placed each 6.25 meters along the streamer.

Of course, the exact distances given are examples only and both the distances between groups and the number of sensors in each group may be optimized for a particular situation or where a particular type of signal is to be detected. Groups of 3 to 12, preferably 4 to 10, more preferably 4 to 6, and most preferably 5 sensors may be located every 10 to 25 meters, preferably every 10 to 20 meters, more preferably every 11 to 15 meters, and most preferably every 12.5 meters along a streamer, with smaller groups of 1 to 5, preferably 2 to 4, and most preferably 3 sensors located at shorter intervals, such as every 2 to 15 meters, preferably every 4 to 8 meters, most preferably every 6.25 meters.

Distances between groups may be averaged, so that the distribution of output points along the streamer section, as well as the distribution of sensors along the streamer section, is non-uniform in order to reduce the effects of noise and aliasing as described above (as shown in the lower example distribution shown in FIG. 10). If non-uniform distribution of output points is used, then fewer may be required along the streamer and the average distances between larger and smaller groups may be able to be increased. A particular pattern of the groups may be repeated several times along each streamer section and a number of such sections may be connected to form a longer streamer.

To account for higher frequencies still, additional single sensors may be included between groups such that an output point is located every 3.125 meters, or at an average of every 3.125 meters if non-uniform distribution of groups and/or output points is used. These sensors will be located midway between a group of 5 sensors and a group of 3 sensors. Each pair of adjacent large and small sensor groups will have a single sensor midway between, or on average midway between if non-uniform group distribution is used.

The table below provides a summary of estimates of the requirements for each frequency range. This table is particularly relevant in a case where particle motion sensors are used, but may be relevant in other cases.

Although it is preferred that the distribution of sensors and of output points is non-uniform along the streamer section, this is not a requirement where frequencies are catered for using different group sets. Sensors can, for example, be located along the length of the streamer at a fixed separation distance and output points used for measurements at different frequencies simply linked to particular groups of these sensors so that the requirements for sensor number and sampling frequency are met.

| Frequency | Maximum distance between output points for unaliased signal | Typical Noise wavelengths | Noise attenuation power needed | Group size needed (number of sensors in group) |
|---|---|---|---|---|
| <15 Hz | 50 m | 2-50 m | >40 dB | 8 to 16 |
| 15-30 Hz | 25 m | 1-6 m | >30 dB | 6 to 12 |
| 30-60 Hz | 12.5 m | 0.5-3 m | 20-30 dB | 4 to 8 |
| 60-120 Hz | 6.25 m | 0.3-1.3 m | 5-20 dB | 2 to 6 |
| 120-240 Hz | 3.125 m | <1 m | <5 dB | 1 to 3 |

FIG. 11 shows a flowchart of a method for reproducing a signal where two sets of sensor groups are included to account for both low and high frequencies in the signal. In the method shown in FIG. 11 groups are distributed with even spacing along the streamer (which will usually mean that output points are also uniformly distributed because these will generally be positioned at the center of each group of sensors). A first group of sensors is specifically designed to attenuate noise in a first frequency band and a second group is specifically designed to attenuate noise in a second, higher, frequency band. These are spaced along the streamer so that the second groups are located between the first groups. Some sensors will belong to both groups. Noise attenuated outputs in the first frequency band are obtained from sensors in the first groups and are interpolated spatially to a smaller spacing to correlate with the spacings of the second group output points. Noise attenuated outputs in the second frequency band can be collected for output points at the smaller spacing from both groups (or just the sensors forming part of the second groups). These outputs for both frequency bands are combined, resulting in an output at the smaller spacing of the second groups for both frequency bands. When obtaining signals for the first frequency band, only the signal from the larger first groups may be used (as this may avoid the use of noisy signals from the second groups with fewer sensors). In some cases, signals from both groups may be used.

FIG. 12 is a flowchart of a similar method for reproducing a signal. The method shown in FIG. 12 relates to sensor groups which are non-uniformly spaced along the streamer. Output points linked to both the first and second groups are non-uniformly spaced in this case. The method is similar to that of FIG. 11 but the method of FIG. 10 must be used when processing the signal from both sets of groups of sensors in order to create a set of noise attenuated regularly spaced outputs from the non-uniformly distributed output points.

So far, we only discussed operations in a common-source setting. We can also consider the possibility of including non-uniformly sampled source points into a high-dimensional reconstruction problem. It is well known that the signal representation in higher dimensions would be even sparser than that in lower dimensions, increasing the quality of reconstruction using CS techniques. This in turn could allow even sparser output point sampling in the first place.

The non-uniformly sampled source points mentioned here can be considered in in-line (general direction of the streamers) as well as cross-line directions. In-line therefore refers to a direction lengthways, or parallel with the direction of the longest side of the streamer. Cross-ways refers to a direction perpendicular to this, or generally parallel with the shortest side of the streamer. The sensors and/or output points can be non-uniformly distributed, or can have varying density, in either or both of in an in-line direction along the streamer and a cross-line direction along the streamer. Furthermore, streamers that are non-uniformly spaced in the cross-line direction can be also considered, adding to the sparsity of signals in high-dimensional signal reconstruction approaches using compressed sensing methods. The same non-uniform distributions, both of output points and of sensors can be applied in the cross-line direction as well as, or instead of, in the in-line direction. In order to extend the blanket of sensors in the cross-line direction as well as along each streamer either several streamers will need to be towed next to each other off the back of a vessel, or the streamer sections will need to have a certain thickness to allow sensors to be mounted on a particular streamer in a 2D rather than a 1D configuration.

In one embodiment, the sensors density is highest around the output points, with a decreasing density of sensors between the output points. In another embodiment, there is no clustering around the output point. In these examples the distribution of the sensors is non-uniform.

Fewer output points (traces) would enable cheaper compressed sensing algorithms. Even though these methods are often computationally expensive; their utilization would be more affordable given the lower number of output traces required to be processed compared to the number of input traces.

We use the word cluster in a general sense, as there can be sensors in between these localities. This approach may find applications in towed streamer, seabed, node, borehole and land seismic data acquisition scenarios Normally a streamer will be made up of multiple streamer sections. In the event that there is only a single streamer section, the streamer section can be referred to a streamer.

The arrays, if used, can be all of the same type or vary by position on the streamer.

This non-uniform distribution of sensors that has been discussed can be applied to channels and analog arrays of sensors. Channels, sensors, analogue arrays of sensors can collectively be referred to as measurement bodies. For the present invention, any of the described measurement bodies could be used.

The invention claimed is:

1. A streamer comprising:
one or more streamer sections connected together to form the streamer, each said streamer section having a plurality of sensors mounted thereon and a plurality of output points to which data from a group of the plurality of sensors is input, the plurality of sensors mounted on each said streamer section including:
a plurality of first sensor groups, each said first sensor group being configured to feed data from the first sensor group to a respective one of the plurality of output points, wherein the output points fed by the plurality of first sensor groups are spaced apart along the streamer section; and
a plurality of second sensor groups, each said second sensor group comprising a fewer number of sensors than a number of sensors in each said first sensor group, wherein each said second sensor group is positioned between adjacent first sensor groups along the streamer section so that the plurality of first sensor groups and the plurality of second sensor groups alternate along an entire length of the streamer section, and with each said second sensor group being configured to feed data from the second sensor group to a respective one of the plurality of output points, and
wherein the plurality of output points for the first sensor groups and the second sensor groups are configured to forward for processing sensor data associated with a signal having a frequency above a threshold frequency and only the output points associated with the plurality of first sensor groups are configured to forward for processing data associated with a signal having a frequency at or below the threshold frequency.

2. The streamer according to claim 1, wherein the plurality of first sensor groups are spaced between 10 and 15 meters apart along the entire length of the streamer section.

3. The streamer according to claim 1, wherein the first sensor groups each comprise 5 sensors and the second sensor groups each comprise 3 sensors.

4. The streamer according to claim 1, wherein each said output point is located midway between positions of outermost sensors in a respective group of sensors from which the output point receives data.

5. The streamer according to claim 1, wherein the plurality of first sensor groups are spaced around 12.5 meters apart along the entire length of the streamer section.

6. The streamer according to claim 1, wherein each said second sensor group is positioned midway between the adjacent first sensor groups along the entire length of the streamer section.

7. The streamer according to claim 1, wherein the threshold frequency is around 60 Hz.

8. The streamer according to claim 1, wherein forwarding data for processing comprises forwarding sensor data including a signal and noise, and processing comprises noise attenuating the sensor data.

9. The streamer according to claim 6, wherein the output points for the plurality of first sensor groups are regularly spaced at a distance d along the entire length of the streamer section.

10. The streamer according to claim 1, wherein the output points for each of the plurality of first sensor groups and the plurality of second sensor groups are irregularly spaced along the entire length of the streamer section.

11. The streamer according to claim 1, wherein the plurality of first sensor groups and the plurality of second sensor groups are analogue arrays or are formed from separate sensors using software means.

12. The streamer according to claim 1, comprising additional second sensor groups which are subsets of the sensors in the first sensor groups such that sensors of the additional second sensor groups belong to both the first sensor groups and the additional second sensor groups.

13. The streamer according to claim 1, wherein sensors in the plurality of first sensor groups and the plurality of second sensor groups are particle motion sensors or pressure sensors.

14. The streamer according to claim 1, wherein sensor positions within the plurality of first sensor groups and the plurality of second sensor groups are regularly or irregularly spaced.

15. The streamer according to claim 1, wherein the streamer sections comprise additional single sensors located half-way between centers of adjacent first and second sensor groups, and the additional single sensors are configured to attenuate noise in a frequency band that is above a second, higher, frequency threshold.

16. A method for performing seismic surveys of an ocean floor using towed marine streamers, comprising:
providing a streamer comprising:
one or more streamer sections, each said streamer section having a plurality of sensors mounted thereon and a plurality of output points to which data from a group of the plurality of sensors is input, the plurality of sensors mounted on each said streamer section including:

a plurality of first sensor groups, each said first sensor group being configured to feed data from the first sensor group to a respective one of the plurality of output points, wherein the output points fed by the plurality of first sensor groups are spaced apart along the streamer; and characterized in that the plurality of sensors mounted on each said streamer section further include:

a plurality of second sensor groups, each said second sensor group comprising a fewer number of sensors than a number of sensors in each said first sensor group, the second sensor groups being positioned between adjacent first sensor groups along the streamer section so that the plurality of first sensor groups and the plurality of second sensor groups alternate along an entire length of the streamer section, and with each said second sensor group being configured to feed data from the second sensor group to a respective one of the plurality of output points;

obtaining data in a first frequency band from only the output points of the plurality of first sensor groups; and obtaining data in a second, higher, frequency band from the output points of the plurality of first sensor groups and the plurality of second sensor groups.

17. The method of claim 16, comprising noise attenuating the data received in the first frequency band and noise attenuating the data received in the second, higher, frequency band to obtain a noise attenuated signal in each said frequency band.

18. The method of claim 16, wherein the output points for the plurality of first sensor groups are regularly spaced at a distance d along the streamer, and the output point for the plurality of second sensor groups are positioned midway between adjacent first sensor groups along the entire length of the streamer section.

19. The method of claim 17, comprising spatially interpolating the noise attenuated data associated in the first frequency band, obtained from only the output points of the plurality of first sensor groups, to a spacing of d/2.

20. The method of claim 19, comprising obtaining combined noise attenuated data at an output spacing of d/2 by combining the interpolated data in the first frequency band with the noise attenuated data in the second frequency band.

21. The method of claim 17, wherein the output points associated with the plurality of first sensor groups and the plurality of second sensor groups are irregularly spaced along the entire length of the streamer section.

22. The method of claim 21, comprising: using compressive sensing techniques and algorithms to reconstruct regularly spaced first group outputs from the noise attenuated output data in the first frequency band, wherein the number of regularly spaced first group outputs is larger than the number of irregularly spaced output points of the first sensor groups; and using compressive sensing techniques and algorithms to reconstruct regularly spaced second group outputs from the noise attenuated output data in the second frequency band, wherein the number of regularly spaced second group outputs is larger than the number of irregularly spaced output points of the first and second sensor groups.

23. The method of claim 22, comprising: using interpolation to produce the same spatial sampling in the regularly spaced first group outputs as in the regularly spaced second group outputs; and combining the regularly spaced first group outputs and the regularly spaced second group outputs.

24. The method of claim 16, comprising using additional single sensors located between centers of adjacent first and second sensor groups to attenuate noise in a third still higher frequency band.

* * * * *